United States Patent
Shin et al.

(10) Patent No.: US 8,450,403 B2
(45) Date of Patent: May 28, 2013

(54) BRANCHED POLYCARBONATE RESIN COMPOSITION, AND BRANCHED POLYCARBONATE RESIN AND MOLDED PRODUCT MADE USING THE SAME

(75) Inventors: Chan-Gyun Shin, Uiwang-si (KR); Sung-Hun Kim, Uiwang-si (KR); Tae-Uk Kim, Uiwang-si (KR); Jong-Cheol Lim, Uiwang-si (KR); Young-Jun Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/642,923

(22) Filed: Dec. 21, 2009

(65) Prior Publication Data

US 2010/0160572 A1 Jun. 24, 2010

(30) Foreign Application Priority Data

Dec. 23, 2008 (KR) .................. 10-2008-0132400

(51) Int. Cl.
*C08K 5/50* (2006.01)
*C08K 5/55* (2006.01)

(52) U.S. Cl.
USPC ........................................ 524/154; 524/184

(58) Field of Classification Search
USPC ............................................... 524/184, 154
See application file for complete search history.

(56) References Cited

U.S. PATENT DOCUMENTS

| 4,959,422 | A  | * | 9/1990  | Gambale et al. ............. 525/463 |
| 5,807,908 | A  |   | 9/1998  | Hirose et al. |
| 6,160,082 | A  | * | 12/2000 | Lin et al. ...................... 528/196 |
| 6,504,002 | B1 | * | 1/2003  | Karlik et al. ................. 528/196 |
| 7,491,788 | B1 | * | 2/2009  | Leenders et al. ............. 528/196 |
| 2004/0116624 | A1 | * | 6/2004 | Bolton et al. ................. 525/461 |
| 2007/0021559 | A1 |   | 1/2007 | Seidel et al. |

FOREIGN PATENT DOCUMENTS

| DE | 60111450 T2 |   | 5/2006 |
| JP | 05-271422   | * | 10/1993 |
| JP | 08-120171   |   | 5/1996 |
| JP | 08-170010   |   | 7/1996 |
| JP | 2000-319499 |   | 11/2000 |
| KR | 10-2004-0074063 A |   | 8/2004 |

OTHER PUBLICATIONS

Machine translation of JP 05-271422. Oct. 1993.*

* cited by examiner

*Primary Examiner* — John Uselding
(74) *Attorney, Agent, or Firm* — Summa, Additon & Ashe, P.A.

(57) ABSTRACT

Disclosed are a branched polycarbonate resin composition that includes: (A) a polycarbonate resin; (B) a polymer including a reactive group being capable of reacting with a hydroxyl group; and (C) an ionic compound including an alkali metal ion, organic cation, or a combination thereof, and a branched polycarbonate resin and a molded product using the same.

8 Claims, 1 Drawing Sheet

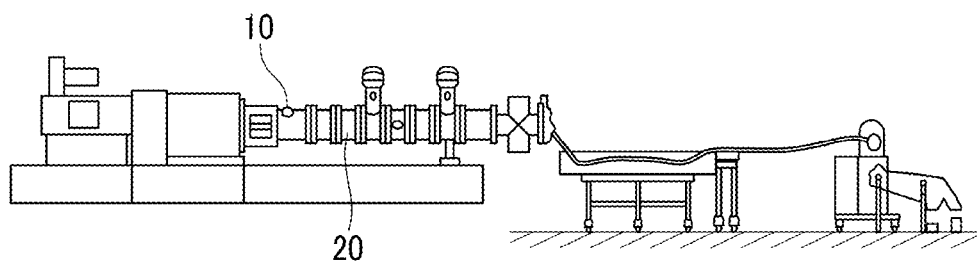

BRANCHED POLYCARBONATE RESIN COMPOSITION, AND BRANCHED POLYCARBONATE RESIN AND MOLDED PRODUCT MADE USING THE SAME

CROSS REFERENCE TO RELATED APPLICATIONS

This application claims priority to and the benefit of Korean Patent Application No. 10-2008-0132400 filed in the Korean Intellectual Property Office on Dec. 23, 2008, the entire disclosure of which is incorporated herein by reference.

FIELD OF THE INVENTION

The present invention relates to a branched polycarbonate resin composition, and a branched polycarbonate resin and a molded product using the same.

BACKGROUND OF THE INVENTION

Polycarbonate resins are engineering plastics having excellent mechanical strength, heat resistance, transparency, and the like, and therefore can be used in the manufacture of various products such as automobile parts, computer housings, other office devices, and the like.

Branched polycarbonate resin is largely required for blow-molding or high fluid injection-molding. Accordingly, branched polycarbonate resin has been the subject of much research to develop a product which can maintain the same excellent advantages of polycarbonate resin such as impact strength, mechanical strength, and heat resistance.

SUMMARY OF THE INVENTION

One aspect of the present invention is a branched polycarbonate resin composition that can have excellent impact strength, heat resistance, and mechanical strength due to high and various molecular weights.

Another aspect of the present invention is a branched polycarbonate resin prepared from the branched polycarbonate resin composition.

According to one aspect of the present invention, a branched polycarbonate resin composition is provided that includes: (A) about 78 to about 99.5 wt % of a polycarbonate resin; (B) about 0.5 to about 20 wt % of a polymer including a reactive group that is reactive with a hydroxyl group; and (C) about 0.0001 to about 2 wt % of an ionic compound comprising an alkali metal ion, organic cation, or a combination thereof.

The polycarbonate resin may have a weight average molecular weight ranging from about 10,000 to about 200,000 g/mol.

The polymer including a reactive group may include a substituent represented by the following Chemical Formula 2 at its side chain.

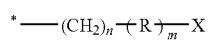

[Chemical Formula 2]

In the above Chemical Formula 2,
n ranges from 0 to 10,
m 0 or 1,
wherein at least one $CH_2$ of $(CH_2)_n$ is optionally substituted with O, S, $SO_2$, COO, CO, SiR'R" or a combination thereof, wherein R' and R" are each independently hydrogen or substituted or unsubstituted C1 to C10 alkyl, and at least one H of $(CH_2)_n$ is optionally substituted with substituted or unsubstituted C1 to C10 alkyl, R is substituted or unsubstituted C6 to C30 arylene or substituted or unsubstituted C1 to C20 alkylene, and X is a reactive group comprising an amine group, an anhydride group, a carboxylic acid group, an epoxy group, an oxazoline group, or a hydroxy group.

The polymer including a reactive group may include an epoxy group. The epoxy group may be included therein in an amount of about 100 to about 300 g/eq.

Examples of the ionic compound including alkali metal ions can include without limitation sodium tetraphenylborate, potassium tetraphenylborate, lithium tetraphenylborate, and combinations thereof. Examples of the ionic compound including organic cations can include without limitation tetraphenylphosphonium benzoate, tetraphenylphosphonium acetate, tetraphenylphosphonium phenolate, tetrabutylammonium tetraphenylborate, tetramethylammonium tetraphenylborate, tetraphenylphosphonium tetraphenylborate, tetra-n-butylphosphonium hydroxide, tetra-n-phenylphosphonium hydroxide, tetra-n-butylammonium hydroxide, tetra-n-phenylammonium hydroxide, tetraethylammonium acetate pentahydrate, and combinations thereof. In one embodiment, the ionic compound may be tetraphenylphosphonium benzoate.

The ionic compound and the polymer including a reactive group may be included at a mixed weight ratio ranging from about 1:1 to about 10:1.

According to another aspect of this disclosure, provided is a branched polycarbonate resin prepared from the branched polycarbonate resin composition.

The branched polycarbonate resin may have a weight average molecular weight ranging from about 30,000 to about 150,000 g/mol, a number average molecular weight ranging from about 5000 to about 15,000 g/mol, a polydispersity index (PDI) ranging from about 1 to about 15, and branch frequency ranging from about 0.2 to about 0.7.

According to another aspect of the present invention, provided is a product molded using the branched polycarbonate resin composition.

Hereinafter, further aspects of the present invention will be described in detail.

BRIEF DESCRIPTION OF THE DRAWING

FIG. 1 is a schematic view of a reaction extruder according to one embodiment of the invention.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "alkylene" refers to a C1 to C30 linear or branched alkylene, for example, a C1 to C10 linear or branched alkylene. The term "arylene" refers to a C6 to C30 arylene.

As used herein, when a specific definition is not otherwise provided, the term "substituted" refers to one substituted with halogen, C1 to C30 alkyl, C1 to C30 haloalkyl, C6 to C30 aryl, C1 to C20 alkoxy, or a combination thereof.

The branched polycarbonate resin composition according to one embodiment includes (A) a polycarbonate resin, (B) a polymer including a reactive group, and (C) an ionic compound.

When the polycarbonate resin (A) and the ionic compound (C) react with each other, the ionic compound (C) can act as a chain scissor and a catalyst to cut the polycarbonate resin (A) into a plurality of polycarbonate compounds having various molecular weights. These cut polycarbonate compounds can react with a polymer including a reactive group (B) as a branching agent, synthesizing a branched polycarbonate resin.

Exemplary components included in the branched polycarbonate resin composition according to embodiments will hereinafter be described in detail.

(A) Polycarbonate Resin

The polycarbonate resin may be prepared by reacting one or more diphenols of the following Chemical Formula 1 with phosgene, halogen acid ester, carbonate ester, or a combination thereof.

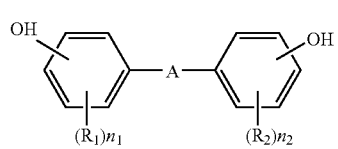

[Chemical Formula 1]

In the above Chemical Formula 1,

A is a linker comprising a single bond, substituted or unsubstituted C1 to C30 linear or branched alkylene, substituted or unsubstituted C2 to C5 alkenylene, substituted or unsubstituted C2 to C5 alkylidene, substituted or unsubstituted C1 to C30 linear or branched haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted C1 to C20 linear or branched alkoxylene, halogen acid ester, carbonate ester, CO, S, or $SO_2$, each of $R_1$ and $R_2$ is independently substituted or unsubstituted C1 to C30 alkyl or substituted or unsubstituted C6 to C30 aryl, and $n_1$ and $n_2$ are each independently integers ranging from 0 to 4.

The diphenols represented by the above Chemical Formula 1 may be used in combinations to constitute repeating units of the polycarbonate resin. Exemplary diphenols include without limitation hydroquinone, resorcinol, 4,4'-dihydroxydiphenyl, 2,2-bis(4-hydroxyphenyl)propane (referred to as "bisphenol-A"), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations thereof. In one embodiment, 2,2-bis(4-hydroxyphenyl)-propane, 2,2-bis(3,5-dichloro-4-hydroxyphenyl)-propane, or 1,1-bis(4-hydroxyphenyl)-cyclohexane of the diphenols may be used. In another embodiment, 2,2-bis(4-hydroxyphenyl)-propane may be used.

In one embodiment, the polycarbonate resin can have a weight average molecular weight ranging from about 10,000 to about 200,000 g/mol, and in another embodiment, a weight average molecular weight ranging from about 15,000 to about 80,000 g/mol, but the present invention is not limited thereto.

The polycarbonate resin may be a mixture of copolymers obtained using two or more diphenols that are different from each other. Exemplary polycarbonate resins include without limitation linear polycarbonate resins, branched polycarbonate resins, polyester carbonate copolymers, and the like, and combinations thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with diphenols and a carbonate. The multi-functional aromatic compound may be included in an amount of about 0.05 to about 2 mol % based on the total weight of the branched polycarbonate resin. The polyester carbonate copolymer resin may include one produced by reacting a difunctional carboxylic acid with diphenols and a carbonate. The carbonate may include a diaryl carbonate such as diphenyl carbonate, and ethylene carbonate.

The branched polycarbonate resin composition may include the polycarbonate resin in an amount of about 78 to about 99.5 wt %, for example about 90 to about 99 wt %%, based on the entire weight of the branched polycarbonate resin composition. When the polycarbonate resin is included in an amount within this range, a product molded using the branched polycarbonate resin composition can have good heat resistance and impact strength, and can be environmentally-friendly.

(B) Polymer Including a Reactive Group

The aforementioned polycarbonate resin reacts with the following ionic compound and is cut into a plurality of polycarbonate compounds. Each polycarbonate compound includes a hydroxyl group. According to one embodiment, a polymer including a reactive group works as a branching agent. The reactive group can react with a hydroxyl group of the cut polycarbonate compound.

The polymer including a reactive group may include a substituent represented by the following Chemical Formula 2 at its side chain.

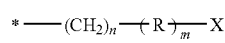

[Chemical Formula 2]

In the above Chemical Formula 2, n ranges from 0 to 10, m is 0 or 1, wherein at least one $CH_2$ of $(CH_2)_n$ is optionally substituted with O, S, $SO_2$, COO, CO, SiR'R", or a combination thereof, wherein R' and R" are each independently hydrogen or substituted or unsubstituted C1 to C10 alkyl, and at least one H of $(CH_2)_n$ is optionally substituted with substituted or unsubstituted C1 to C10 alkyl, R is substituted or unsubstituted C6 to C30 arylene or substituted or unsubstituted C1 to C20 alkylene, and X is a reactive group comprising an amine group, an anhydride group, a carboxylic acid group, an epoxy group, an oxazoline group, or a hydroxy group.

The polymer including a reactive group may include a copolymer having a vinyl group at its main chain The copolymer having the vinyl group may include a copolymer of an aromatic vinyl compound and a vinyl cyanide compound.

Exemplary aromatic vinyl compounds can include without limitation styrene, o-ethylstyrene, m-ethylstyrene, p-ethylstyrene, 2,4-dimethylstyrene, alpha-methylstyrene, and the like, and combinations thereof. In one embodiment, the aromatic vinyl compound can include styrene.

Exemplary vinyl cyanide compounds can include without limitation acrylonitrile, methacrylonitrile, and the like, and combinations thereof.

An example of a copolymer having the vinyl group includes a copolymer of styrene and acrylonitrile.

The substituent of the above Chemical Formula 2 may include one represented by the following Chemical Formulae 3 to 12.

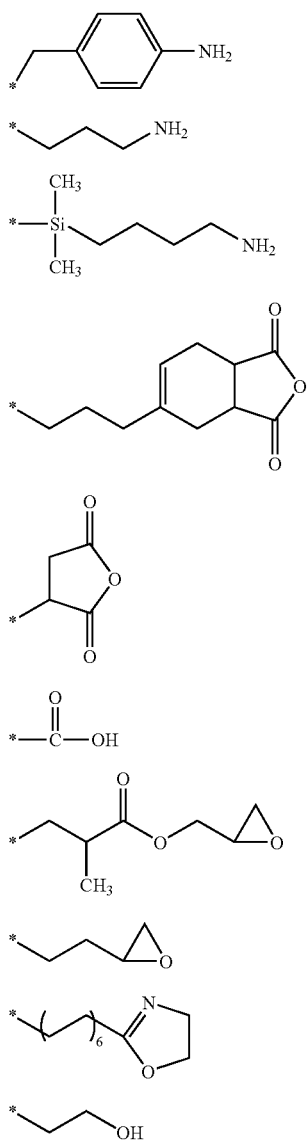

In other words, a branched polycarbonate resin is provided by reacting the reactive group inside the substituent with a polycarbonate compound having various molecular weights.

The polymer including a reactive group according to one embodiment may include an epoxy group, and the epoxy group can be included in an amount of about 1 to about 1000 g/eq, and as another example about 100 to about 300 g/eq. When the polymer including a reactive group includes an epoxy group in an equivalent amount within these ranges, there may be almost or substantially no unreacted epoxy group.

The branched polycarbonate resin composition can include the polymer including the reactive group in an amount of about 0.5 to about 20 wt %, for example about 0.5 to about 10 wt %, based on the entire weight of the branched polycarbonate resin composition. When the polymer including the reactive group is included in an amount within this range, it can provide excellent impact strength, heat resistance, mechanical strength, and workability of a product molded from the branched polycarbonate resin composition.

(C) Ionic Compound

According to one embodiment, the ionic compound may include an alkali metal ion, organic cation, or a combination thereof.

Examples of the ionic compound including alkali metal ions can include without limitation sodium tetraphenylborate, potassium tetraphenylborate, lithium tetraphenylborate, and the like, and combinations thereof.

Examples of the ionic compound including organic cations can include without limitation tetraphenylphosphonium benzoate, tetraphenylphosphonium acetate, tetraphenylphosphonium phenolate, tetrabutylammonium tetraphenylborate, tetramethylammonium tetraphenylborate, tetraphenylphosphonium tetraphenylborate, tetra-n-butylphosphonium hydroxide, tetra-n-phenylphosphonium hydroxide, tetra-n-butylammonium hydroxide, tetra-n-phenylammonium hydroxide, tetraethylammonium acetate pentahydrate, and the like, and combinations thereof. In one embodiment, the organic cation may be tetraphenylphosphonium benzoate.

The ionic compound can react with the aforementioned polycarbonate resin and can play a role of cutting it into polycarbonate compounds with various molecular weights.

The branched polycarbonate resin composition can include the ionic compound in an amount of about 0.0001 to about 2 wt %, for example about 0.01 to about 1 wt %, based on the entire weight of the branched polycarbonate resin composition. When the ionic compound is included in an amount within these ranges, it may cut the main chain of a polycarbonate resin and thereby increase reactivity and makes its molecular weight distribution uniform.

According to an embodiment, the polymer including a reactive group (B) and the ionic compound (C) can be mixed in a weight ratio of about 1:1 to about 10:1, for example, in a weight ratio of about 1:1 to about 3:1. When the polymer including a reactive group (B) and the ionic compound (C) are mixed within these weight ratio ranges, they may increase reactivity and thereby decrease the amount of unreacted polycarbonate resin and increase branching effects.

(D) Other Additives

The branched polycarbonate resin composition according to one embodiment may further include one or more additives.

Exemplary additives include without limitation antibacterial agents, heat stabilizers, antioxidants, release agents, light stabilizers, compatibilizers, inorganic material additives, surfactants, coupling agents, plasticizers, admixtures, stabilizers, lubricants, antistatic agents, flame-proofing agents, weather-resistance agents, colorants, ultraviolet (UV) blocking agents, filler, nucleating agents, adhesion aids, adhesive, and the like, and combinations thereof.

Exemplary antioxidants may include without limitation phenol-type antioxidants, phosphite-type antioxidants, thio-ether-type antioxidants, amine-type antioxidants and the like and combinations thereof. Exemplary release agents may include without limitation fluorine—including polymers, silicone oils, metal salts of stearic acid, metal salts of montanic acid, montanic acid ester waxes, polyethylene waxes, and the like, and combinations thereof. Exemplary weather-resistance agents may include without limitation benzophenone-type weather-resistance agents, amine-type weather-resistance agents, and the like, and combinations thereof. Exemplary colorants may include without limitation dyes, pigments, and the like, and combinations thereof. Exemplary ultraviolet (UV) blocking agents may include without limitation titanium dioxide (TiO$_2$), carbon black, and the like, and combinations thereof. Exemplary filler may include without limitation glass fiber, carbon fiber, silica, mica, alumina, calcium carbonate, calcium sulfate, glass beads, and the like, and combinations thereof. The filler can improve properties such as mechanical strength and heat resistance. Exemplary nucleating agents may include without limitation talc, clay, and the like, and combinations thereof.

The additive may be appropriately included, so long as it does not deteriorate properties of the branched polycarbonate resin composition. For example, the branched polycarbonate resin composition can include the additive in an amount of about 0.1 to about 40 part by weight, for example about 0.1 to about 30 part by weight, based on 100 part by weight of the branched polycarbonate resin composition.

According to another embodiment, provided is a branched polycarbonate resin prepared using the branched polycarbonate resin composition.

The branched polycarbonate resin may have a weight average molecular weight ranging from about 30,000 to about 150,000 g/mol, for example about 34,500 to about 150,000 g/mol. In addition, the branched polycarbonate resin may have a number average molecular weight ranging from about 5000 to about 15,000 g/mol.

In addition, the branched polycarbonate resin may have a polydispersity index (PDI) ranging from about 1 to about 15, for example, from about 1 to about 3.

Furthermore, the branched polycarbonate resin may have a branch frequency ranging from about 0.2 to about 0.7, for example, from about 0.35 to about 0.7. The branch frequency indicates the number of average branches per polycarbonate polymer chain.

The branched polycarbonate resin may be prepared by injecting the aforementioned components in a reaction extruder. FIG. 1 shows an exemplary reaction extruder which can be used in accordance with the present invention.

FIG. 1 is a schematic view of a reaction extruder 1 according to one embodiment.

According to one embodiment, a branched polycarbonate resin can be prepared by putting a polycarbonate resin (A), a polymer including a reactive group (B), an ionic compound (C), and optionally one or more other additives through a hopper 10 of the reaction extruder 1 and reacting them in a screw 20 thereof, unlike a conventional polymerization method. The reaction extrusion can be a simpler process and may have lower equipment costs than a conventional polymerization.

The reaction of the reaction extruder 1 may be performed at a temperature ranging from about 200 to about 400° C., for example, from about 250 to about 300° C. Performing the reaction at a temperature within these ranges may increase reactivity.

According to another embodiment, provided is a product molded using the aforementioned branched polycarbonate resin composition. The molded product can have excellent impact strength, heat resistance, mechanical strength, and workability, and thereby may be used in the production of automobile parts, computer housings, other office devices, and the like.

The following examples illustrate this disclosure in more detail. However, it is understood that this disclosure is not limited by these examples.

EXAMPLES

A branched polycarbonate resin composition according to one embodiment includes each component as follows.

(A) Polycarbonate Resin

PANLITE L-1250WP made by Japanese Teijin Chemicals Ltd., which is a bisphenol-A type of polycarbonate resin having a weight average molecular weight of 25,000 g/mol, is used.

(B) Polymer Including a Reactive Group

ADR4368S made by BASF Co., which is a polymer with an epoxy group having an epoxy equivalent ranging from 100 to 300 g/eq, is used.

(C) Ionic Compound

Tetraphenylphosphonium benzoate is used.

Example 1 and Comparative Examples 1 to 3

Each of the aforementioned components A, B, and C are added to a reaction extruder and reacted together as shown in the following Table 1 at a feed rate of 40 kg/hr, a screw rpm of 240, a temperature ranging from 250 to 300° C., and a screw configuration of 45φ Regular, L/D=36.

Then, the reactant is extruded in a twin-screw extruder at a temperature ranging from 180 to 240° C. and prepared into pellets.

The specimens according to Example 1 and Comparative Examples 1 to 3 are evaluated using the following methods. The results are provided in the following Table 1.

(1) Branch frequency: acquired through GPC-TDA analysis.

(2) IZOD Impact strength: measured according to ASTM D256 (¼", ⅛" notch).

(3) Heat resistance (VST): measured according to ASTM D1525.

(4) Flexural strength: measured according to ASTM D790 (2.8 mm/min).

(5) Flexural modulus: measured according to ASTM D790 (2.8 mm/min).

TABLE 1

|  | Unit | Ex. 1 | Ex. 2 | Comp. Ex. 1 | Comp. Ex. 2 | Comp. Ex. 3 |
| --- | --- | --- | --- | --- | --- | --- |
| (A) Polycarbonate resin | wt % | 98.91 | 89 | 98.91 | 98.91 | 96.4 |
| (B) Polymer including a reactive group | wt % | 0.6 | 10 | 0.4 | 1.09 | 0.6 |

TABLE 1-continued

|  | Unit | Ex. 1 | Ex. 2 | Comp. Ex. 1 | Comp. Ex. 2 | Comp. Ex. 3 |
|---|---|---|---|---|---|---|
| (C) Ionic compound | wt % | 0.49 | 1 | 0.69 | 0 | 3 |
| Branched polycarbonate resin — number average molecular weight (Mn) | g/mol | 7,800 | 18,200 | 11,200 | 9,900 | 2,100 |
| weight average molecular weight (Mw) | g/mol | 35,700 | 980,000 | 23,000 | 20,900 | 28,200 |
| molecular weight distribution (PDI) | — | 4.5 | 3.0 | 2.1 | 2.1 | 5.2 |
| a* | — | 0.385 | 0.572 | — | — | 0.697 |
| b** | — | 1.97 | 1.2 | — | — | 0.1 |
| c*** | — | 0.4 | 0.5 | — | — | 0.08 |
| IZOD impact strength ¼" | kgf·cm/cm | 17.2 | 14 | 3 | 12.3 | 5 |
| ⅛" | kgf·cm/cm | 104 | 62 | 20 | 92 | 20 |
| Heat resistance (VST) | °C. | 148.3 | 148.2 | 140 | 148.3 | 144 |
| Flexural strength | kgf/cm2 | 733 | 720 | 660 | 680 | 703 |
| Flexural modulus | kgf/cm2 | 108 | 102 | 101 | 93 | 85 |

*a is a Mark-Houwink constant. A value of 0.65 or less indicates a branch structure. The Mark-Houwink constant can be acquired through a Mark-Houwink equation shown by the following Equation 1.
[Equation 1]
g' = [η]branched/[η]linear
In Equation 1, g' (branching index value) determines dilute solution viscosity of a branched polycarbonate resin and provides an indirect analysis method of branching degrees, "[η]branched" refers to intrinsic viscosities of a branched polycarbonate resin, and "[η]linear" refers to linear polymers of equivalent molar masses, and a Mark-Houwink constant.
**b indicates the number of polycarbonate branches connected to a polymer including a reactive group.
***c is branch frequency and indicates the average number of branches per polycarbonate polymer chain based on an actual weight average molecular weight.

Table 1 shows that the branched polycarbonate resin according to Examples 1 and 2 has a Mark-Houwink constant of 0.65 or less. However, Comparative Example 1 including a polymer including a reactive group in an amount outside the range of the present invention and Comparative Example 2 including no ionic compound did not form a branched polycarbonate resin. In addition, Comparative Example 3 including an ionic compound in an amount outside the range of the present invention has a Mark-Houwink constant of higher than 0.65, which means it has no branch structure.

Examples 1 and 2 having a branched polycarbonate resin have better impact strength, heat resistance, and mechanical strength than Comparative Examples 1 to 3 having no branch structure.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising:
(A) about 78 to about 99.5 wt% of a polycarbonate resin;
(B) 0.6 to about 20 wt% of a polymer including a reactive group that is reactive with a hydroxyl group, wherein the polymer including a reactive group is a copolymer of an aromatic vinyl compound and a vinyl cyanide compound comprising a substituent represented by the following Chemical Formula 2 at its side chain:

[Chemical Formula 2]

wherein, in the above Chemical Formula 2,
n ranges from 0 to 10,
m is 0 or 1,
wherein at least one $CH_2$ of $(CH_2)_n$ is optionally substituted with O, S, $SO_2$, COO, CO, SiR'R", or a combination thereof, wherein R' and R" are each independently hydrogen or substituted or unsubstituted C1 to C10 alkyl, and at least one H of $(CH_2)_n$ is optionally substituted with substituted or unsubstituted C1 to C10 alkyl,
R is substituted or unsubstituted C6 to C30 arylene or substituted or unsubstituted C1 to C20 alkylene, and
X is a reactive group comprising an epoxy group; and
(C) about 0.0001 to about 2 wt% of an ionic compound comprising tetraphenylphosphonium benzoate, tetraphenylphosphonium acetate, tetraphenylphosphonium phenolate, tetraphenylphosphonium tetraphenylborate, tetra-n-butylphosphonium hydroxide, tetra-n-phenylphosphonium hydroxide, or a combination thereof,
wherein the polymer including a reactive group and the ionic compound are included at a mixed weight ratio of about 1:1 to about 10:1.

2. The polycarbonate resin composition of claim 1, wherein the polycarbonate resin has a weight average molecular weight of about 10,000 to about 200,000 g/mol.

3. The polycarbonate resin composition of claim 1, wherein the epoxy group is included in an amount of about 100 to about 300 g/eq.

4. The polycarbonate resin composition of claim 1, wherein the ionic compound comprising a phosphonium compound comprises tetraphenylphosphonium benzoate.

5. A branched polycarbonate resin prepared from the polycarbonate resin composition according to claim 1, wherein the branched polycarbonate resin has branch frequency of about 0.2 to about 0.7, a weight average molecular weight of about 30,000 to about 150,000 g/mol, and a number average molecular weight of about 5000 to about 15,000 g/mol.

6. The branched polycarbonate resin of claim 5, wherein the branched polycarbonate resin has a polydispersity index (PDI) of about 1 to about 15.

7. A molded product made using the polycarbonate resin composition according to claim 1.

8. A composition comprising a branched polycarbonate prepared from (A) about 78 to about 99.5 wt% of a polycarbonate resin; and (B) 0.6 to about 20 wt% of a polymer including a reactive group that is reactive with a hydroxyl group, wherein the polymer including a reactive group is a copolymer of an aromatic vinyl compound and a vinyl cyanide compound comprising a substituent represented by the following Chemical Formula 2 at its side chain:

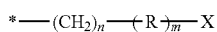

[Chemical Formula 2]

wherein, in the above Chemical Formula 2,
n ranges from 0 to 10,
m is 0 or 1, wherein at least one $CH_2$ of $(CH_2)_n$ is optionally substituted with O, S, $SO_2$, COO, CO, SiR'R", or a combination thereof, wherein R' and R" are each independently hydrogen or substituted or unsubstituted C1 to C10 alkyl, and at least one H of $(CH_2)_n$ is optionally substituted with substituted or unsubstituted C1 to C10 alkyl, R is substituted or unsubstituted C6 to C30 arylene or substituted or unsubstituted C1 to C20 alkylene, and X is a reactive group comprising an epoxy group, wherein the composition further includes (C) about 0.0001 to about 2 wt% of an ionic compound comprising tetraphenylphosphonium benzoate, tetraphenylphosphonium acetate, tetraphenylphosphonium phenolate, tetraphenylphosphonium tetraphenylborate, tetra-n-butylphosphonium hydroxide, tetra-n-phenylphosphonium hydroxide, or a combination thereof, wherein the polymer including a reactive group and the ionic compound are included at a mixed weight ratio of about 1:1 to about 10:1.

* * * * *